(12) United States Patent
Propheter-Hinckley et al.

(10) Patent No.: US 11,951,532 B2
(45) Date of Patent: Apr. 9, 2024

(54) ADDITIVELY MANUFACTURED CORE

(71) Applicant: RAYTHEON TECHNOLOGIES CORPORATION, Farmington, CT (US)

(72) Inventors: Tracy A. Propheter-Hinckley, Manchester, CT (US); Dominic J. Mongillo, Jr., West Hartford, CT (US); Benjamin T. Fisk, East Granby, CT (US)

(73) Assignee: RTX CORPORATION, Farmington, CT (US)

( * ) Notice: Subject to any disclaimer, the term of this patent is extended or adjusted under 35 U.S.C. 154(b) by 859 days.

(21) Appl. No.: 16/701,614

(22) Filed: Dec. 3, 2019

(65) Prior Publication Data
US 2020/0101525 A1    Apr. 2, 2020

Related U.S. Application Data

(62) Division of application No. 14/904,991, filed as application No. PCT/US2014/045172 on Jul. 2, 2014, now Pat. No. 10,525,525.

(Continued)

(51) Int. Cl.
*B22C 9/10* (2006.01)
*B22C 9/00* (2006.01)
(Continued)

(52) U.S. Cl.
CPC .................. *B22C 9/04* (2013.01); *B22C 9/00* (2013.01); *B22C 9/10* (2013.01); *B22C 9/103* (2013.01);
(Continued)

(58) Field of Classification Search
None
See application file for complete search history.

(56) References Cited

U.S. PATENT DOCUMENTS 4,642,993 A * 2/1987 Sweet ..................... F23R 3/002
428/116
5,250,136 A   10/1993 O'Connor
(Continued)

FOREIGN PATENT DOCUMENTS

CN    101890480 A  *  11/2010
CN    102896278 A  *   1/2013
(Continued)

OTHER PUBLICATIONS

DE 19918908 machine translation (Year: 2000).*
(Continued)

*Primary Examiner* — Paul A Wartalowicz
*Assistant Examiner* — Stephani Hill
(74) *Attorney, Agent, or Firm* — Carlson, Gaskey & Olds, P.C.

(57) ABSTRACT

A method of preparing a casting article for use in manufacturing a gas turbine engine part according to an exemplary aspect of the present disclosure includes, among other things, communicating a powdered material to an additive manufacturing system and preparing a casting article that includes at least one trunk and a skin core that extends from the at least one trunk out of the powdered material. A casting article is also disclosed.

10 Claims, 8 Drawing Sheets

Related U.S. Application Data

(60) Provisional application No. 61/856,308, filed on Jul. 19, 2013.

(51) Int. Cl.

| | | |
|---|---|---|
| *B22C 9/04* | (2006.01) | |
| *B22C 9/22* | (2006.01) | |
| *B22C 9/24* | (2006.01) | |
| *B22F 5/00* | (2006.01) | |
| *B22F 10/28* | (2021.01) | |
| *B22F 10/38* | (2021.01) | |
| *B33Y 10/00* | (2015.01) | |
| *B33Y 80/00* | (2015.01) | |
| *C04B 35/64* | (2006.01) | |
| *F01D 5/14* | (2006.01) | |
| *F01D 5/18* | (2006.01) | |
| *F01D 5/28* | (2006.01) | |
| *F01D 9/04* | (2006.01) | |
| *F01D 11/08* | (2006.01) | |
| *F01D 25/12* | (2006.01) | |
| *B22F 3/24* | (2006.01) | |

(52) U.S. Cl.
CPC .............. *B22C 9/106* (2013.01); *B22C 9/22* (2013.01); *B22C 9/24* (2013.01); *B22F 5/009* (2013.01); *B22F 10/28* (2021.01); *B22F 10/38* (2021.01); *F01D 5/147* (2013.01); *F01D 5/187* (2013.01); *F01D 5/284* (2013.01); *F01D 9/041* (2013.01); *F01D 11/08* (2013.01); *F01D 25/12* (2013.01); *B22F 3/24* (2013.01); *B22F 2003/244* (2013.01); *B33Y 10/00* (2014.12); *B33Y 80/00* (2014.12); *C04B 35/64* (2013.01); *F05D 2220/32* (2013.01); *F05D 2230/211* (2013.01); *F05D 2230/22* (2013.01); *F05D 2240/12* (2013.01); *F05D 2240/30* (2013.01); *F05D 2240/55* (2013.01); *F05D 2260/202* (2013.01); *F05D 2300/211* (2013.01); *F05D 2300/2112* (2013.01)

(56) References Cited

U.S. PATENT DOCUMENTS

| | | | | |
|---|---|---|---|---|
| 7,407,365 B2* | 8/2008 | Dodd | ........................ | F01D 5/18 415/115 |
| 7,845,906 B2* | 12/2010 | Spangler | ................ | F01D 5/186 416/97 R |
| 2003/0059305 A1* | 3/2003 | Bather | .................... | F01D 5/186 415/115 |
| 2005/0035501 A1 | 2/2005 | Chikugo | | |
| 2008/0190582 A1 | 8/2008 | Lee et al. | | |
| 2009/0274549 A1* | 11/2009 | Mitchell | ................. | F01D 5/186 415/115 |
| 2010/0003142 A1 | 1/2010 | Piggush et al. | | |
| 2011/0176930 A1* | 7/2011 | Ahmad | ................... | F01D 5/187 416/97 R |
| 2011/0262695 A1 | 10/2011 | Lee et al. | | |
| 2011/0293771 A1 | 12/2011 | Oberhofer et al. | | |
| 2012/0237786 A1* | 9/2012 | Morrison | ............... | B22D 19/00 164/91 |
| 2012/0291983 A1 | 11/2012 | Graham | | |
| 2013/0026338 A1 | 1/2013 | Castle et al. | | |
| 2013/0071562 A1 | 3/2013 | Szuromi et al. | | |
| 2013/0280081 A1* | 10/2013 | Propheter-Hinckley | ..................... | F01D 5/187 416/223 R |
| 2016/0339516 A1 | 11/2016 | Xu | | |

FOREIGN PATENT DOCUMENTS

| | | | | |
|---|---|---|---|---|
| DE | 19918908 A1 * | 11/2000 | .............. | B22C 9/10 |
| JP | 06023505 A * | 2/1994 | | |
| WO | 2013163037 | 10/2013 | | |
| WO | 2014105113 | 7/2014 | | |
| WO | 2014197061 | 12/2014 | | |

OTHER PUBLICATIONS

JP H06-023505 machine translation (Year: 1994).*
CN 102896278 machine translation (Year: 2013).*
CN 101890480 machine translation (Year: 2010).*
International Search Report and Written Opinion for International Application No. PCT/US2014/045172 dated Oct. 16, 2014.
Extended European Search Report for European Application No. 14825685.2 completed Feb. 17, 2017.
International Preliminary Report on Patentability for International Application No. PCT/US2014/045172 dated Jan. 28, 2016.
Gibson, I., Rosen, D.W., and Stucker, B. (2010). Additive manufacturing technologies: Rapid prototyping to direct digital manufacturing. Springer Science + Business Media, LLC. 2010.
European Search Report for European Patent Application No. 22163094.0 dated Jul. 7, 2022.

* cited by examiner

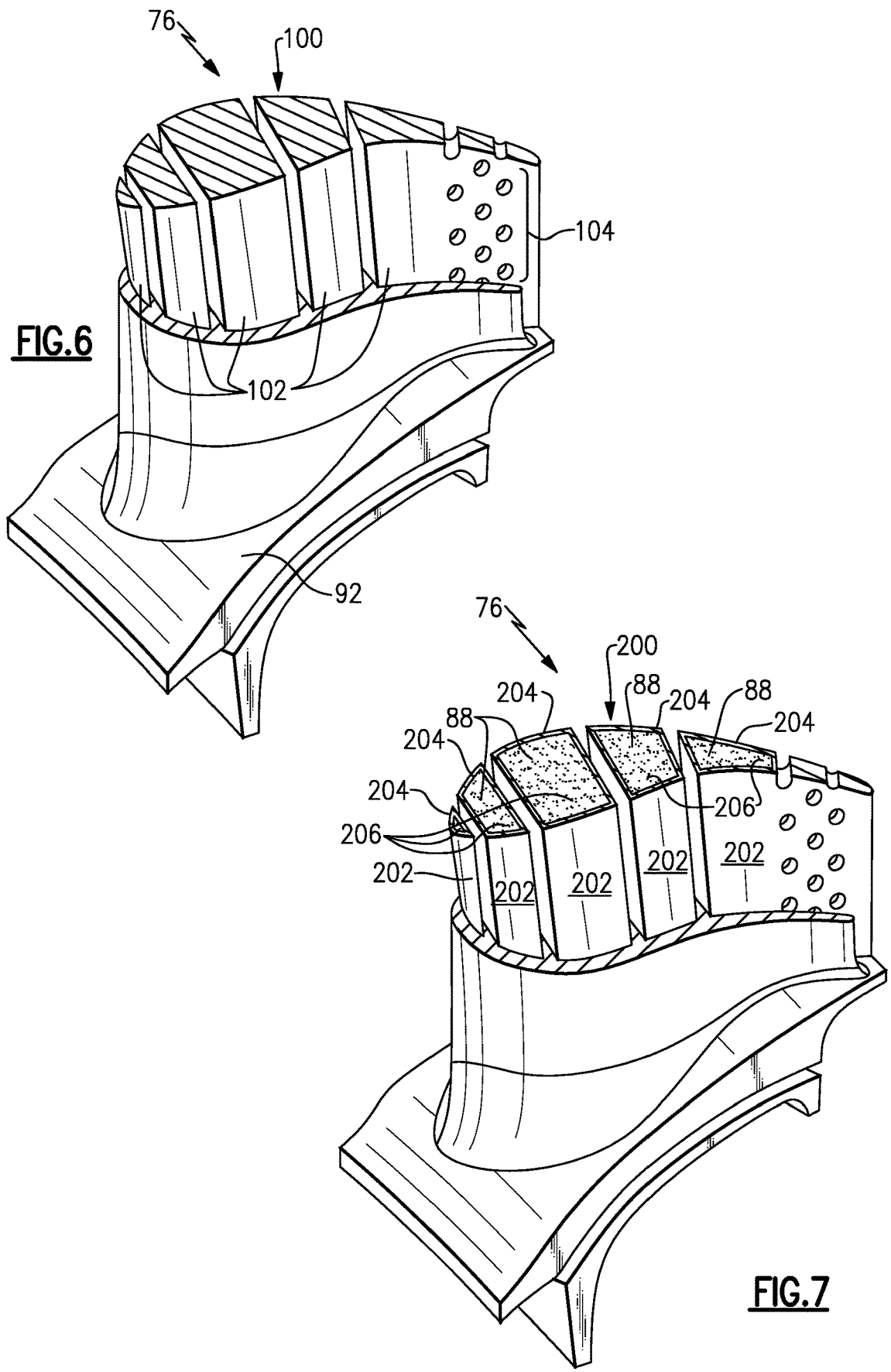

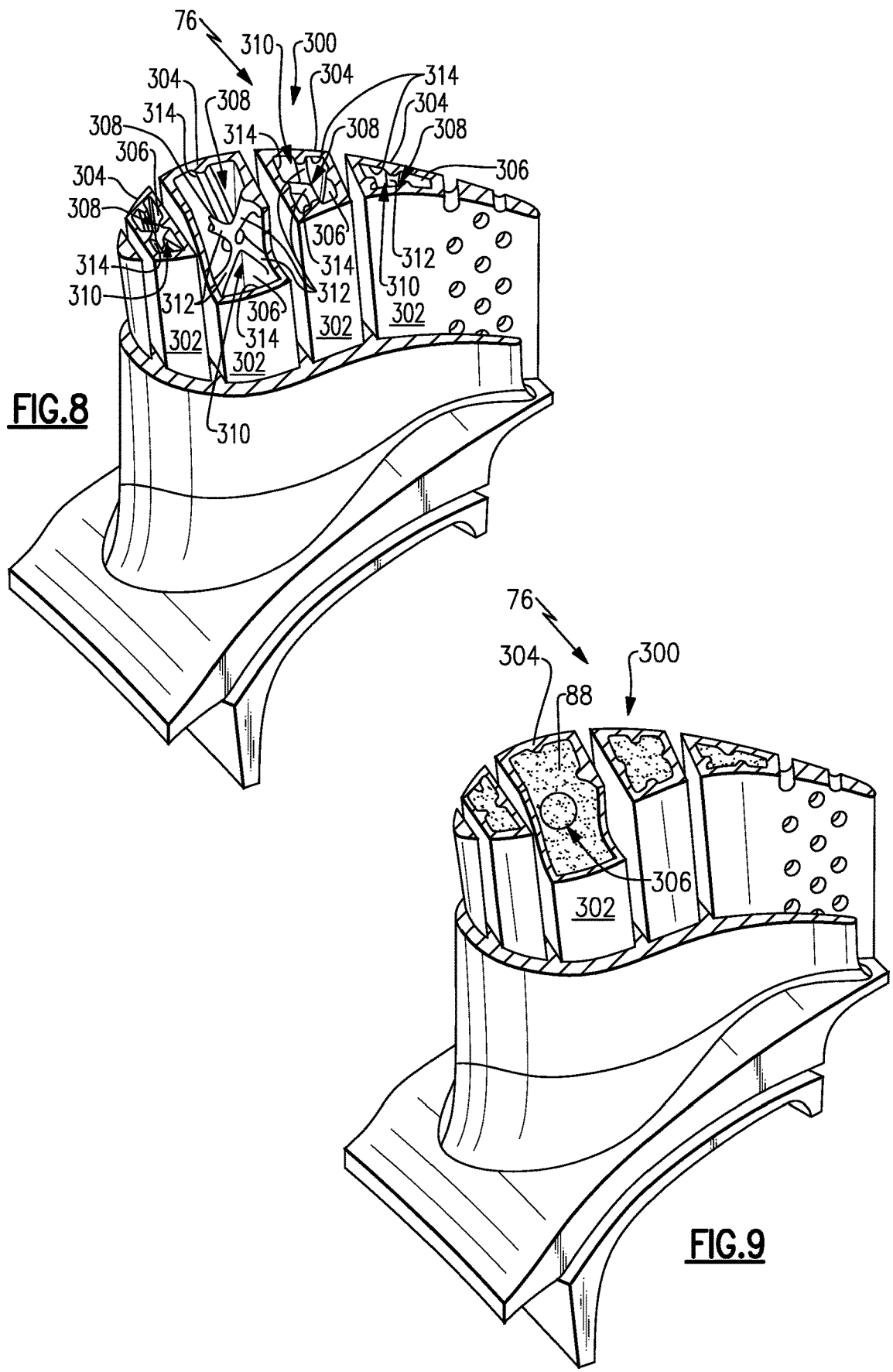

ADDITIVELY MANUFACTURED CORE

CROSS-REFERENCE TO RELATED APPLICATIONS

This application is a divisional of U.S. application Ser. No. 14/904,991, filed Jan. 14, 2016, which is a national phase application of International Application No. PCT/US2014/045172, filed Jul. 2, 2014, which claims the benefit of U.S. Provisional Application 61/856,308, filed Jul. 19, 2013.

BACKGROUND

This disclosure relates generally to an additively manufactured casting article and method for preparing the same. The casting article can be used to manufacture a gas turbine engine part having a desired internal cooling circuitry.

Gas turbine engines typically include a compressor section, a combustor section, and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other engine loads.

Due to exposure to hot combustion gases, numerous components of a gas turbine engine may include internal cooling features. Current manufacturing techniques may limit the possible internal cooling features that can be formed inside of gas turbine engine parts. Many parts are cast using a mold having two or more portions secured to one another to define an exterior surface of the part. A core may be positioned relative to the mold to form the internal cooling features of the part, including but not limited to mainbody cooling passages, impingement holes, ribs, microcircuits, or other structures. The core is typically assembled from multiple elements constructed from different materials. The core elements are assembled to one another in what is often a painstaking assembly process.

SUMMARY

A method of preparing a casting article for use in manufacturing a gas turbine engine part according to an exemplary aspect of the present disclosure includes, among other things, communicating a powdered material to an additive manufacturing system and preparing a casting article that includes at least one trunk and a skin core that extends from the at least one trunk out of the powdered material.

In a further non-limiting embodiment of the foregoing method, the powdered material includes a refractory metal.

In a further non-limiting embodiment of either of the foregoing methods, the powdered material includes a ceramic, silica or alumina.

In a further non-limiting embodiment of any of the foregoing methods, the powdered material includes at least two of a refractory metal, a ceramic, a silica and an alumina.

In a further non-limiting embodiment of any of the foregoing methods, the method of communicating includes positioning the powdered material on a delivery platform, moving the delivery platform relative to a build platform and depositing a layer of the powdered material onto the build platform.

In a further non-limiting embodiment of any of the foregoing methods, the method of preparing includes melting a first layer of the powdered material to form a first cross-sectional layer of the casting article, spreading a second layer of the powdered material on top of the first cross-sectional layer and melting the second layer to form a second cross-sectional layer of the casting article.

In a further non-limiting embodiment of any of the foregoing methods, the first cross-sectional layer and the second cross-sectional layer are formed with reference to CAD data communicated to the additive manufacturing system.

In a further non-limiting embodiment of any of the foregoing methods, the at least one trunk includes a solid core geometry.

In a further non-limiting embodiment of any of the foregoing methods, the at least one trunk includes an outer shell body filled with the powdered material.

In a further non-limiting embodiment of any of the foregoing methods, the at least one trunk includes an internal matrix formed inside of an outer shell body.

In a further non-limiting embodiment of any of the foregoing methods, at least one of the at least one trunk and the skin core includes a vascular network.

In a further non-limiting embodiment of any of the foregoing methods, the step of preparing includes integrally building the at least one trunk and the skin core with the additive manufacturing system.

A method of preparing a core for use in casting a gas turbine engine part according to another exemplary aspect of the present disclosure includes, among other things, depositing multiple layers of a powdered material onto one another using an additive manufacturing system and joining the layers to one another with reference to CAD data relating to a particular cross-section of a desired core geometry of a core. A core is produced having the core geometry which includes at least a trunk that forms a mainbody cooling passage of a cast gas turbine engine part and a skin core that forms an internal cooling feature of the cast gas turbine engine part.

In a further non-limiting embodiment of the foregoing method, the powdered metal includes at least one of a refractory metal, a silica and an alumina.

In a further non-limiting embodiment of either of the foregoing methods, the method includes melting at least a portion of a second layer of the powdered material to adhere the second layer to a first layer.

In a further non-limiting embodiment of any of the foregoing methods, a portion of the core geometry is filled with the powdered metal.

In a further non-limiting embodiment of any of the foregoing methods, the core geometry includes an internal matrix formed inside of the trunk.

In a further non-limiting embodiment of any of the foregoing methods, at least a portion of the core geometry includes a vascular network.

In a further non-limiting embodiment of any of the foregoing methods, the method includes integrally building the at least one trunk and the skin core with the additive manufacturing system.

A casting article according to an exemplary aspect of the present disclosure includes, among other things, a trunk and a skin core that extends from the trunk. At least one of the trunk and the skin core includes a portion that embodies a vascular network.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIGS. 6, 7, 8, 9, 10 and 11 illustrate multiple core geometries that can be additively manufactured.

DETAILED DESCRIPTION

This disclosure relates to an additively manufactured casting article, such as a core. An additive manufacturing system may be used to create a core that embodies any of an infinite number of core geometries. Exemplary core geometries may include a body portion having an internal matrix or a vascular network made of a plurality of nodes and branches. Among other features, the additively manufactured cores of this disclosure can be custom tailored to provide desirable core compliance properties, leachability properties, build time properties, thermal expansion and retention properties, etc.

Figure 1:
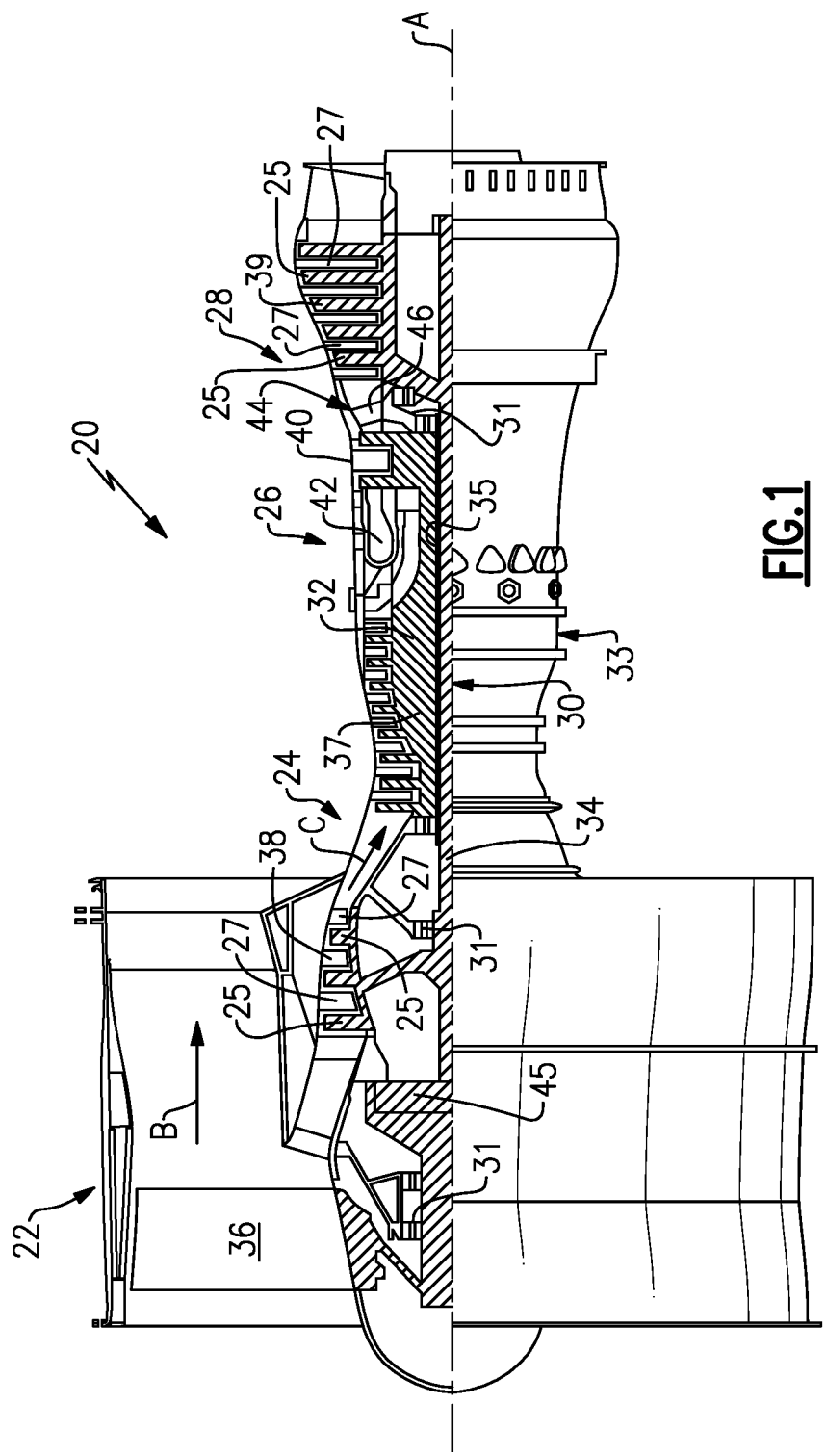
FIG. 1 illustrates a schematic, cross-sectional view of a gas turbine engine.

FIG. 1 schematically illustrates a gas turbine engine 20. The exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ °R)/(518.7°\ R)]^{0.5}$. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 create or extract energy (in the form of pressure) from the core airflow that is communicated through the gas turbine engine 20 along the core flow path C. The vanes 27 direct the core airflow to the blades 25 to either add or extract energy.

Various components of the gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling features for cooling the parts during engine operation.

Figure 2:
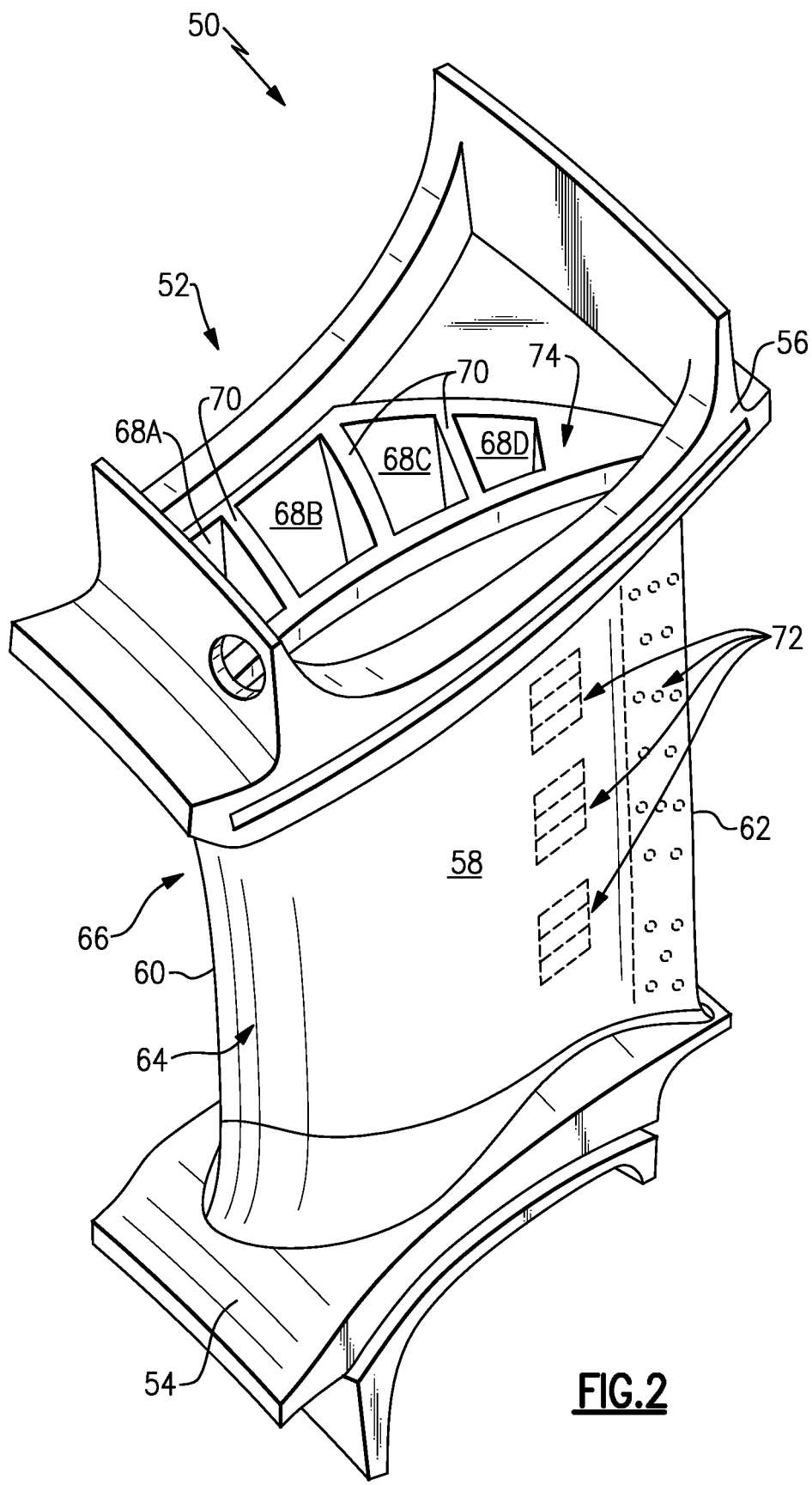
FIG. 2 illustrates a gas turbine engine part.
Figure 4:
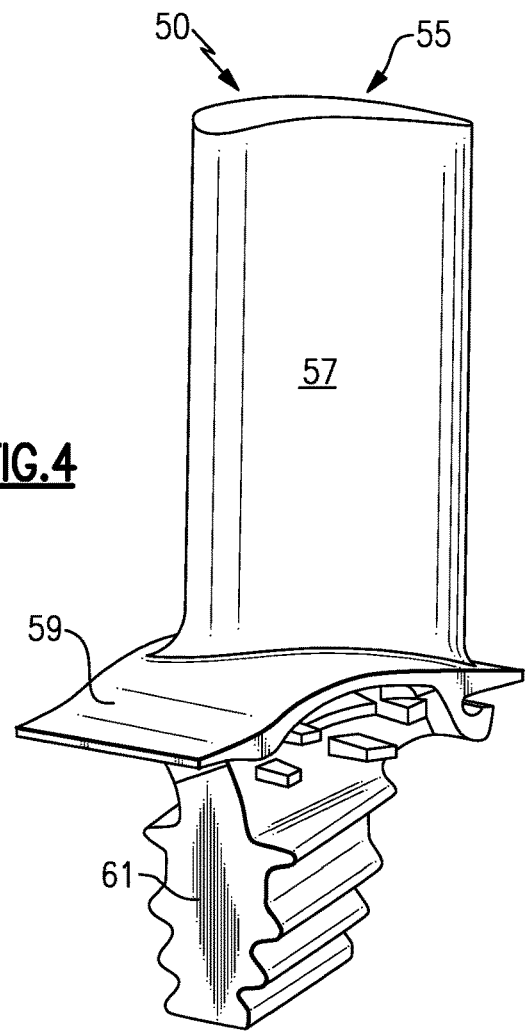
FIG. 4 illustrates another gas turbine engine part.

FIG. 2 illustrates a part 50 that can be manufactured in a casting process, such as an investment casting process. Other manufacturing techniques are also contemplated as within the scope of this disclosure. In the illustrated embodiment, the part 50 is a vane 52 of the turbine section 28 of the gas turbine engine 20. Although the part 50 is illustrated as a vane 52 of the turbine section 28, the various features of this disclosure are applicable to any manufactured part of a gas turbine engine, including but not limited to vanes, blades, blade outer air seals (BOAS), or any other part. For example, in a second non-limiting embodiment, the part 50 could be a blade 55 that includes an airfoil 57, a platform 59 and a root 61 (see, for example, FIG. 4).

The part 50 includes an inner platform 54, an outer platform 56, and an airfoil 58 that extends between the inner platform 54 and the outer platform 56. The airfoil 58 includes a leading edge 60, a trailing edge 62, a pressure side 64 and a suction side 66. Although a single airfoil is depicted, other parts are also contemplated, including parts having multiple airfoils (i.e., vane doublets).

The part 50 can include internal mainbody cooling passages 68A, 68B, 68C and 68D that are separated by ribs 70. The part 50 can additionally include various microcircuits, skin cores, trailing edge exits or other internal cooling features, some of which are shown schematically at 77. The internal mainbody cooling passages 68A, 68B, 68C and 68D and the various other internal cooling features 77 define an internal circuitry 74 for cooling the part 50. The internal circuitry 74 of the part 50 represents but one example of many potential cooling circuits and the example shown is in no way intended to limit this disclosure. Stated another way, various alternative cooling passages and internal circuitry configurations could alternatively or additionally be cast in the part 50. The actual design of the internal circuitry 74 may depend on the cooling requirements of the part 50, among other criteria.

In operation, cooling airflow, such as bleed airflow from the compressor section 24, is communicated through the internal mainbody cooling passages 68A, 68B, 68C and 68D and can be circulated through the other internal cooling features 77. The cooling airflow is circulated through the internal circuitry 74 to cool the part 50.

Figure 3:
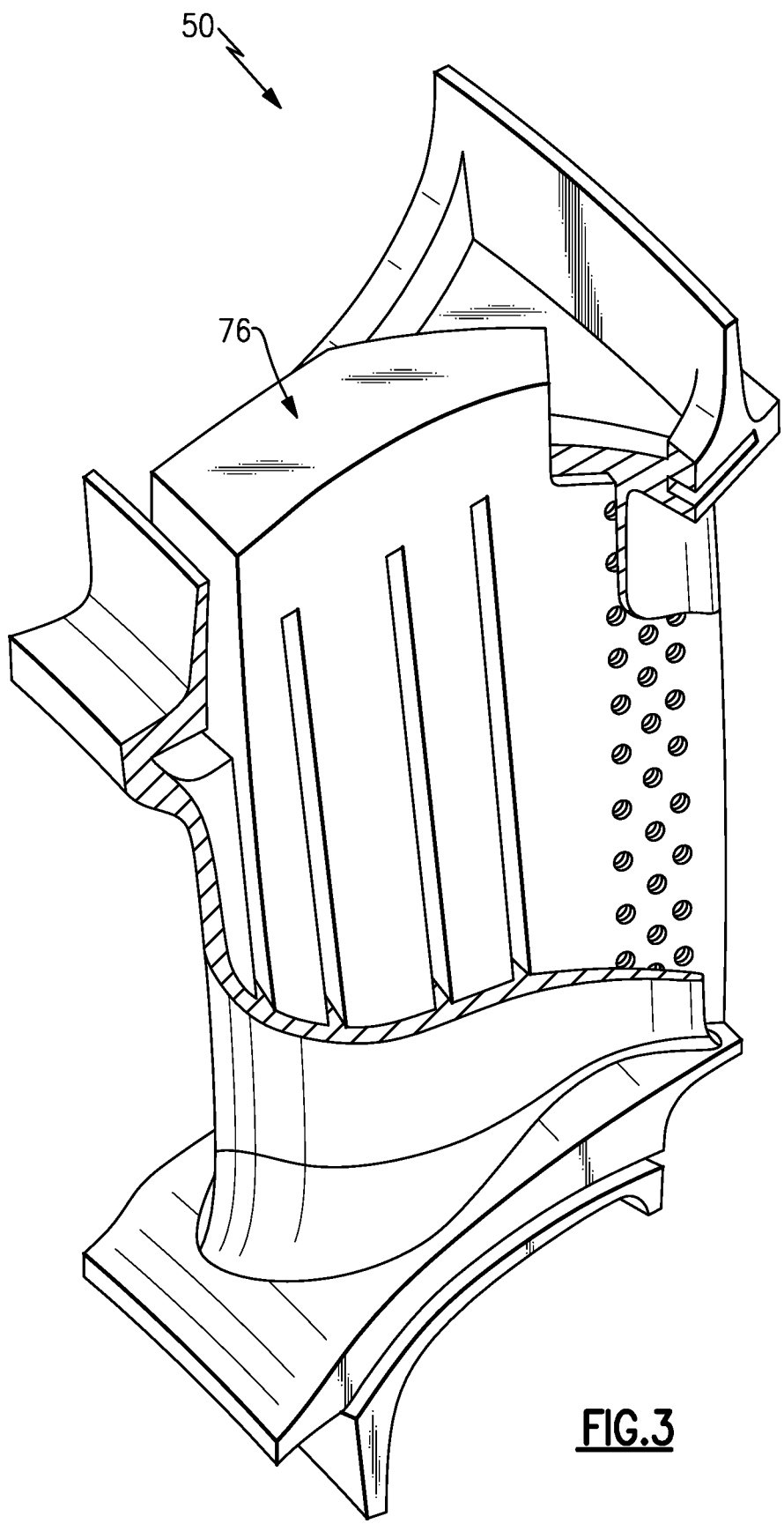
FIG. 3 illustrates a partial cut-away view of a gas turbine engine part prior to removal of a core.

FIG. 3 illustrates the part 50 of FIG. 2 prior to removal of a core 76 that is used during a manufacturing process, such as part of a casting system, to define the internal circuitry 74 (see FIG. 2) of the part 50. The core 76 may be removed, such as in a leaching operation, to produce the part 50 shown in FIG. 2.

The core 76 includes a core geometry suitable to form the various features of the internal circuitry 74 (both the mainbody cooling passages 68 and the internal cooling features 77). In one embodiment, the core 76 is a refractory metal core made out of a refractory metal such as molybdenum, tungsten, niobium, tantalum, rhenium or other refractory metal materials. Use of refractory metals affords the core 76 the ability to withstand relatively high casting temperatures and provides some measure of ductility. In another embodiment, ceramic, silica or alumina materials may be used to form the core 76. In yet another embodiment, any combination of materials, including but not limited to refractory metals, ceramics, silica, and alumina, may be used to prepare the core 76.

In one embodiment, the core 76 is prepared using an additive manufacturing process. An example additive manufacturing system and method for its use in order to prepare such a core is detailed below.

Figure 5:
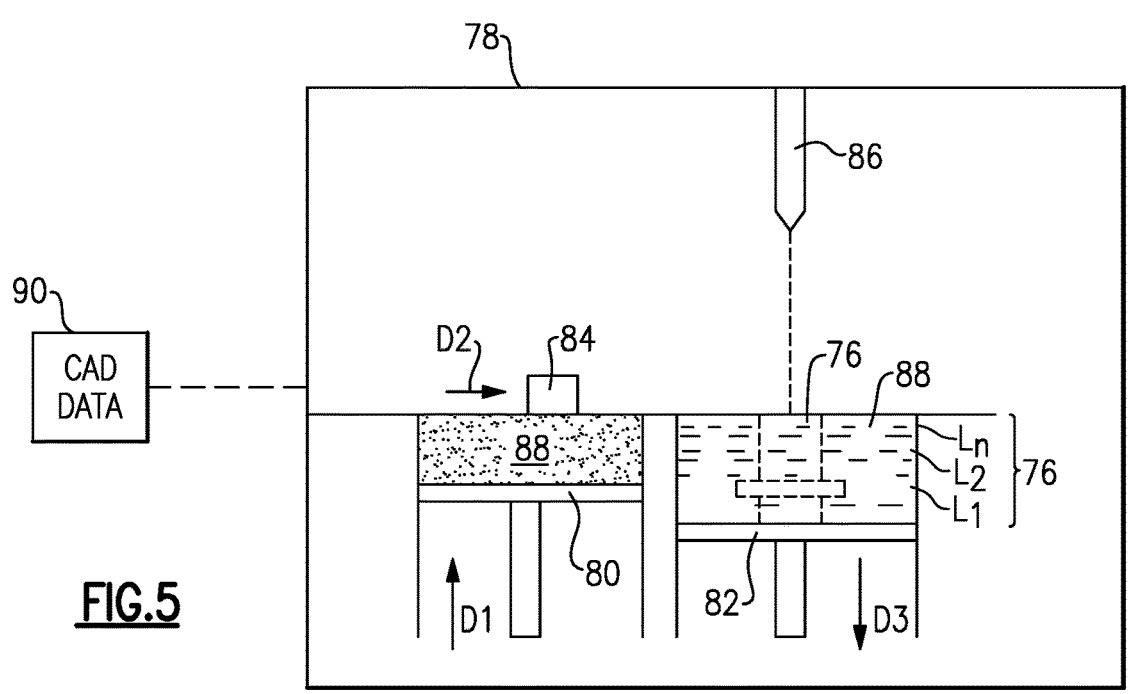
FIG. 5 illustrates an additive manufacturing system for preparing a core for use in manufacturing a gas turbine engine part.

FIG. 5 illustrates an additive manufacturing system 78 that can be used to manufacture a casting article, such as the core 76 of FIG. 3 or any other casting article of a casting system, including a core, shell, gating, etc. (see FIG. 12 for example casting system). In one embodiment, the additive manufacturing system 78 includes a delivery platform 80, a build platform 82, a spreader 84 and a melting device 86 (or sintering device). The delivery platform 80 carries a powdered material 88, such as a refractory metal powder, a silica powder, an alumina powder, or a combination including at least two of such powders. The build platform 82 is a substrate on which the core 76 is additively built. The melting device 86 could include a laser or an electron beam melting device, although other melting and/or sintering devices are also contemplated.

In one non-limiting use of the additive manufacturing system 78, the delivery platform 80 is movable in a first direction D1 to position the powdered material 88 relative to the build platform 82. The spreader 84 can move in a second direction D2 (i.e., perpendicular to the first direction D1) to spread a thin layer of the powdered material 88 on the build platform 82. The melting device 86 may then be actuated to melt the layer of powdered material 88 at locations where the geometry of the core 76 is to exist to prepare a first layer L1 of the core 76. Some portion of the powdered material 88 may remain within the core 76 after the melting step. This powdered material 88 can be removed or remain inside the core 76 to provide support.

Once the first layer L1 is completed, the build platform 82 may be moved in a direction D3 (opposite of the direction D1). In one embodiment, the build platform 82 is moved in the direction D3 by a distance equal to about one layer. Next, another layer of the powdered material 88 may be deposited on the build platform 82 via the spreader 84. For example, the layer of powdered material 88 may be spread over the previously formed first layer L1. The melting device 86 melts the second layer of powdered material 88 to prepare a second layer L2 of the core 76. The second layer L2 is adhered to the first layer L1 during the melting process. This layer by layer process may be repeated over a total of Ln layers until the entire core 76 with a desired core geometry has been additively built.

In one embodiment, the layers L1 to Ln of the core 76 may be joined to one another with reference to CAD data 90, which defines a cross-section of a desired geometry of the core 76. The CAD data 90 is communicated to the additive manufacturing system 78 and provides the necessary numerical data for manufacturing the core 76.

The additive manufacturing system 78 and method of use described above is but one exemplary configuration for additively manufacturing a casting article, such as a core, shell or other article. It should be appreciated that the additive manufacturing system 78 could include additional features not described with reference to the highly schematic depiction of FIG. 5.

With the layers built upon one another and joined to one another cross-section by cross-section, a core 76 having any desired core geometry can be generated. For example, additively manufactured cores can be created as full solids, thin shelled solids with or without powder fills, thin shelled solids having an internal matrix with or without powder fills, or core geometries that include vascular features. FIGS. 6-11 illustrate multiple core geometries that can be created using an additive manufacturing system and process similar to that described above. This disclosure is not limited to the exact core geometries that are shown, and it should be understood that any casting article can be additively manufactured to include any combination of features, including any combination of the features shown in FIGS. 6-11.

Referring to FIG. 6, a core 76 may be additively manufactured to include a core geometry 100 that defines a dimensional negative of a desired internal circuitry of a cast gas turbine engine part. The core geometry 100 may include one or more trunks 102. In one embodiment, the trunks 102 of the core geometry 100 embody a completely solid geometry. During a casting process, the trunks 102 form the mainbody cooling passages of the cast gas turbine engine part (see, for example, features 68A, 68B, 68C and 68D of the part 50 of FIG. 2).

One or more of the trunks 102 may be additively formed to include various secondary features 104. For example, the secondary features 104 may form cooling holes, impingement features or other features in the cast gas turbine engine part. The core 76 may be enveloped in a wax pattern 92 in order to prepare it for manufacturing the gas turbine engine part with an internal circuitry (see, for example, internal circuitry 74 of FIG. 2).

FIG. 7 illustrates a core geometry 200 of a core 76 that can be formed in an additive manufacturing process. In this embodiment, the core geometry 200 includes one or more trunks 202. Each trunk 202 may include an outer shell body 204 that defines a hollow interior 206. The hollow interior 206 can optionally be filled with a powdered material 88 (which may include portions of powdered material that were not sintered during the additive manufacturing process) or the powdered material 88 could be removed after the additive manufacturing process.

A core geometry 300 such as illustrated by FIG. 8 may include one or more trunks 302 having an outer shell body 304 that defines an interior 306. An internal matrix 308 can be formed within the interior 306. In other words, the trunks 302 may be only partially hollow. In one embodiment, the internal matrix 308 includes at least one lattice structure 310. The lattice structure 310 may include a plurality of branches 312 that extend between opposing inner walls 314 of the outer shell body 304. The interior 306 of the outer shall body 304 may be filled with a powdered material 88 that settles around the branches 312 of the lattice structure 310, as shown in FIG. 9.

Figure 10:
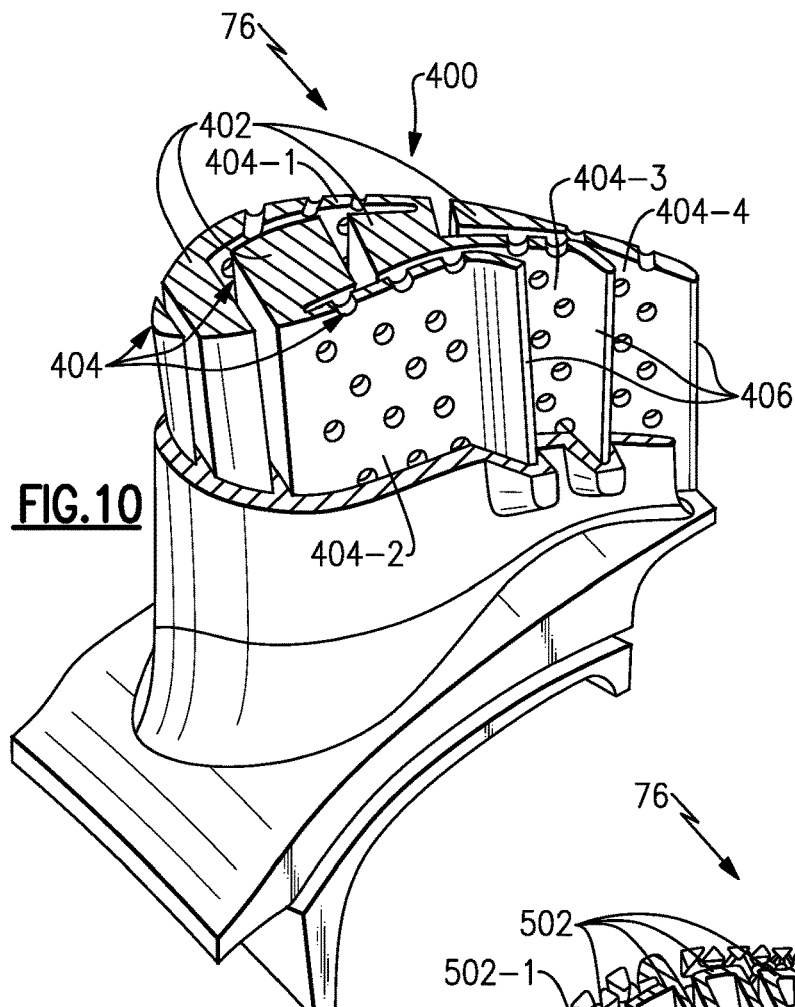

FIG. 10 illustrates yet another core geometry 400 that can be formed by additively manufacturing a core 76. The core geometry 400 includes one or more trunks 402 that form the mainbody cooling passages of a cast gas turbine engine part. A skin core 404 may extend from one or more of the trunks 402. In one embodiment, the trunks 402 and the skin cores 404 are integrally built during the additive manufacturing process as part of the core geometry 400. The skin cores 404 form the internal cooling features of the cast gas turbine engine part, such as a microcircuit or core exit (see, for example, features 77 of the part 50 of FIG. 2).

In one non-limiting embodiment, some skin cores (as illustrated by skin core 404-1) extend between adjacent trunks 402 of the core geometry 400. Other skin cores (as illustrated by skin cores 404-2, 404-3 and 404-4) can include flaps 406 that are configured to form core exits that jut out from a cast gas turbine engine part.

Figure 11:
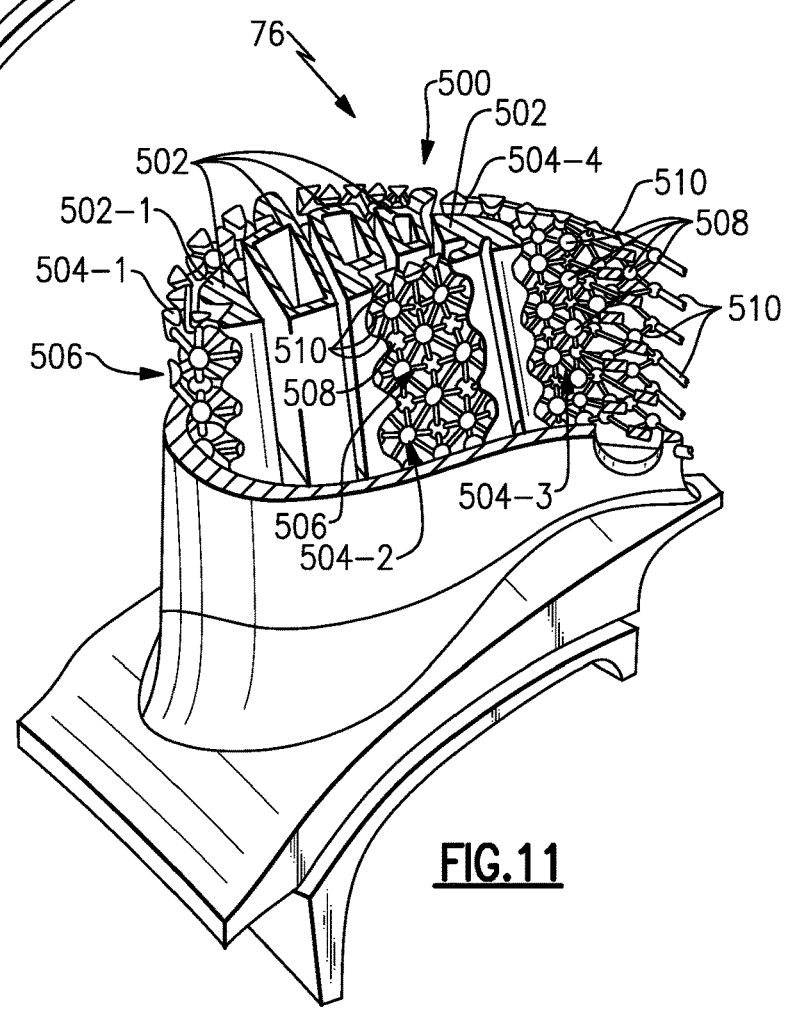

FIG. 11 illustrates yet another additively manufactured core geometry 500 that can include one or more trunks 502 and skin cores 504 connected to the trunks 502. All or part of the core geometry 500 may be made up of a vascular network 506.

The vascular network 506 may include a plurality of nodes 508 and a plurality of branches 510 that extend between each of the plurality of nodes 508. The nodes 508 and the branches 510 may be configured in any manner relative to one another and may have a uniform or non-uniform pattern. In one embodiment, the vascular network 506 includes a hollow vascular network structure having interconnected internal hollow passages extending inside of the nodes 508 and the branches 510. In another embodiment, the nodes 508 and the branches 510 of the vascular network are solid structures.

In one embodiment, the trunks (see, for example, trunk 502-1) embody a vascular network 506. In another embodiment, the skin cores (see, for example, skin cores 504-1, 504-2, 504-3 and 504-4) embody a vascular network 506. In yet another embodiment, the trunks 502 and the skin cores 504 are both additively manufactured to include a vascular network 506.

Figure 12:
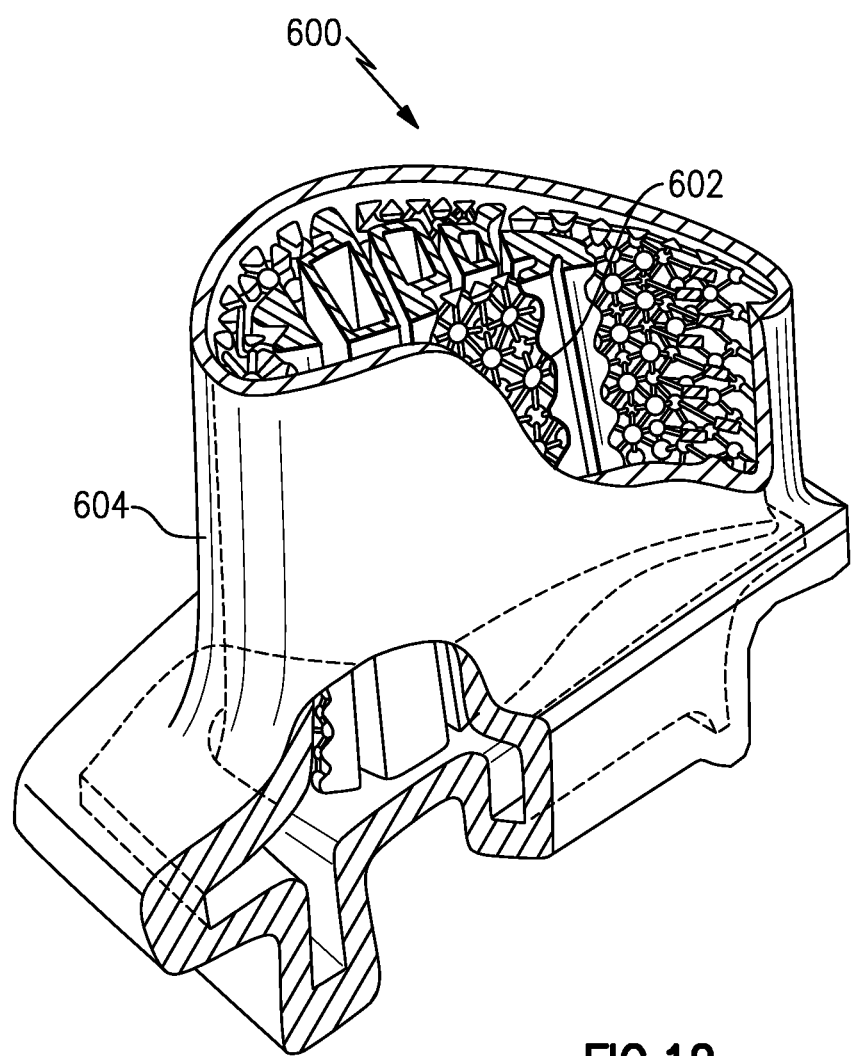
FIG. 12 illustrates a casting system that can be additively manufactured.

FIG. 12 illustrates a casting system 600 that can be used to cast a gas turbine engine part. The casting system 600 includes one or more casting articles. In one embodiment, the casting system 600 includes a core 602 for forming the internal features of the cast gas turbine engine part, and a shell 604 for forming the external features of the cast gas turbine engine part. The core 602 can include any of the core geometries described above, or any other geometry. The casting system 600 could additionally include gating, spru cups, risers, etc. The entirety of the casting system 600, or only portions thereof, may be additively manufactured using the system and method described above.

The additively manufactured casting articles of this disclosure may enable one or more of the following features:

The production of cooled gas turbine engine parts having advanced, multi-wall cooling design configurations. These parts can be investment cast using nickel based alloys (or other materials) to generate equiaxed, directionally solidified, or single crystal alloy material types.

Increased design space as it relates to radial and axial tapering of core cooling channel heights to optimize internal pressure loss, heat transfer, cooling air heat pickup, and thermal convective efficiency.

The fabrication of unique internal core geometry features that are otherwise not manufacturable using current manufacturing technologies such as progressive stamping, coining, punching, EDM, ECM, or laser cut methods.

The manufacture of unique internal core passage geometries to transfer flow from mainbody core sections to the skin core cooling channels which are traditionally created using a "cold" working forming processes through mechanical bending of refractory metal core geometry.

Eliminate the need for multiple core assemblies of refractory metal core and mainbody ceramic core geometries used with conventional core material (silica, alumina) and constant thickness refractory metal core geometry.

Eliminate the thermal mismatch in coefficient of thermal expansion that exists between two different core geometry materials, such as refractory metal and ceramic core bodies.

Enable barrier coatings to be fully applied using additive manufacturing processes to cover the entire refractory metal core surface area to ensure there is no interaction (alloying) between the refractory metal cores and nickel based alloys.

Improve/reduce relative core displacement and internal/external wall variation enabling design configurations with "thinner" nominal exterior and interior wall thicknesses.

Enable double wall cooling configuration which reduces airfoil weight, blade pull, rotor disk weight and overall propulsion system weight.

Enable the integration and manufacture of small film cooling hole geometries to be integrally fabricated with the internal cooling geometries ensuring optimal relative placement and film coolant ejection over airfoil, platform, and tip regions which are subjected to locally higher external heat load.

Enable cooling air to be resupplied through various conduit shapes, sizes, and slots to improve the utilization and convection thermal cooling efficiency of the overall cooling design figuration.

Provide the ability to produce core geometries that contain multiple conduits and lattice structures for larger core body cavities.

Enable improved leaching of the refractory metal core during the investment casting process.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A casting article for a gas turbine engine, comprising:
    a core having a core geometry including a first trunk and a second trunk that forms respective mainbody cooling passages separated by an internal rib of a cast gas turbine engine part and a skin core that forms an internal cooling passage of the cast gas turbine engine part, the skin core extending from the first trunk and the second trunk;
    wherein the core includes multiple layers of a powdered material deposited onto one another, the multiple layers are joined to one another, and the multiple layers include at least a portion of a second layer of the powdered material that is melted to adhere the second layer to a first layer;
    wherein each of the first trunk and the skin core includes a respective vascular network established in a volume of the respective main body and internal cooling passages, the vascular network includes a plurality of spherical nodes and a plurality of elongated branches that extend between the plurality of nodes to establish a lattice structure, and the vascular network is a hollow vascular network structure having interconnected internal hollow passages extending inside of the plurality of nodes and the plurality of branches;
    wherein the skin core is dimensioned to follow a contour of a shell that establishes an external wall of the cast gas turbine engine part; and
    wherein the skin core interconnects the first trunk and the second trunk such that the internal cooling passage extends between to interconnect the mainbody cooling passages.

2. The casting article as recited in claim 1, wherein the powdered material includes at least one of a refractory metal, a silica and an alumina.

3. The casting article as recited in claim 1, wherein a portion of the core geometry is at least partially filled with the powdered material.

4. The casting article as recited in claim 1, wherein the second trunk includes an outer shell body defining a hollow interior, and the hollow interior is at least partially filled with the powdered material.

5. The casting article as recited in claim 1, wherein the second trunk and the skin core are integrally formed.

6. The casting article as recited in claim 1, wherein the cast gas turbine engine part is an airfoil.

7. The casting article as recited in claim 6, wherein the cast gas turbine engine part is a turbine vane.

8. The casting article as recited in claim 6, wherein the cast gas turbine engine part is a blade.

9. The casting article as recited in claim 1, wherein the cast gas turbine engine part is an airfoil.

10. The casting article as recited in claim 1, wherein the second trunk lacks any vascular network, the second trunk includes an outer shell defining a hollow interior, and the skin core extends outwardly from the outer shell.

* * * * *